US011139882B2

(12) United States Patent
Deghel et al.

(10) Patent No.: US 11,139,882 B2
(45) Date of Patent: Oct. 5, 2021

(54) ENHANCED BEAM ADJUSTMENT PROCEDURE FOR BEAM-BASED OPERATION

(71) Applicant: Nokia Technologies Oy, Espoo (FI)

(72) Inventors: Matha Deghel, Paris (FR); Mihai Enescu, Espoo (FI); Sami Hakola, Kempele (FI); Sigen Ye, Whitehouse Station, NJ (US); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/983,728

(22) Filed: Aug. 3, 2020

(65) Prior Publication Data
US 2021/0050900 A1 Feb. 18, 2021

Related U.S. Application Data

(60) Provisional application No. 62/888,029, filed on Aug. 16, 2019.

(51) Int. Cl.
*H04L 23/02* (2006.01)
*H04B 7/06* (2006.01)
(Continued)

(52) U.S. Cl.
CPC .......... *H04B 7/0695* (2013.01); *H04W 24/02* (2013.01); *H04W 72/046* (2013.01); *H04W 72/1284* (2013.01)

(58) Field of Classification Search
CPC ... H04L 1/0054; H04L 1/005; H04L 25/0226; H04B 7/088; H04B 7/017; H04B 7/0695; H04B 17/309; H04W 16/18
(Continued)

(56) References Cited

U.S. PATENT DOCUMENTS

2018/0199226 A1 7/2018 Tsai et al.
2018/0206170 A1 7/2018 Nagaraja et al.
(Continued)

FOREIGN PATENT DOCUMENTS

WO 2018/143391 A1 8/2018
WO 2018/232245 A1 12/2018
(Continued)

OTHER PUBLICATIONS

Extended European Search Report received for corresponding European Patent Application No. 20189496.1, dated Dec. 23, 2020, 19 pages.
(Continued)

*Primary Examiner* — Khai Tran
(74) *Attorney, Agent, or Firm* — Squire Patton Boggs (US) LLP

(57) ABSTRACT

A method may include receiving, from a network node, association and configuration information for a plurality of sequences, where each sequence may be associated to at least one network-node beam or beam-pair link. The method may also include performing beam measurements of beams from the network node to obtain beam measurement information. The method may further include detecting beam misalignment of the beam based on the beam measurement information. In addition, the method may include transmitting a sequence among the plurality of sequences to the network node to inform the network node of the beam misalignment, and to trigger the network node to start a beam adjustment procedure and a monitoring procedure for a configured-grant configuration. Further, the method may include, after transmitting the sequence, considering the indicated preferred beam as a new serving beam, and switching to the configured-grant configuration associated with this new serving beam.

18 Claims, 7 Drawing Sheets

(51) Int. Cl.
*H04W 24/02* (2009.01)
*H04W 72/04* (2009.01)
*H04W 72/12* (2009.01)

(58) Field of Classification Search
USPC .......................................... 375/262, 260, 267
See application file for complete search history.

(56) References Cited

U.S. PATENT DOCUMENTS

| | | | |
|---|---|---|---|
| 2018/0227899 A1 | 8/2018 | Yu et al. | |
| 2018/0302889 A1 | 10/2018 | Guo et al. | |
| 2019/0215136 A1 | 7/2019 | Zhou et al. | |
| 2019/0215896 A1* | 7/2019 | Zhou | H04B 7/088 |
| 2019/0254110 A1* | 8/2019 | He | H04W 76/28 |
| 2020/0037332 A1* | 1/2020 | da Silva | H04L 5/0023 |
| 2020/0205085 A1* | 6/2020 | Li | H04B 7/0682 |
| 2020/0351069 A1* | 11/2020 | Grant | H04L 5/0051 |

FOREIGN PATENT DOCUMENTS

| | | |
|---|---|---|
| WO | 2019/112499 A1 | 6/2019 |
| WO | 2019/128975 A1 | 7/2019 |

OTHER PUBLICATIONS

"3rd Generation Partnership Project; Technical Specification Group Radio Access Network; NR; Physical layer procedures for data (Release 15)", 3GPP TS 38.214, V15.2.0, Jun. 2018, pp. 1-9.

"3rd Generation Partnership Project; Technical Specification Group Radio Access Network; NR; Physical layer measurements(Release 15)", 3GPP TS 38.215, V15.5.0, Jun. 2019, pp. 1-16.

"WI Summary of New Radio Access Technology", 3GPP TSG RAN Meeting #80, RP-181378, Agenda : 9.3.1, NTT Docomo, Inc., Jun. 11-14, 2018, pp. 1-13.

* cited by examiner

ENHANCED BEAM ADJUSTMENT PROCEDURE FOR BEAM-BASED OPERATION

CROSS REFERENCE TO RELATED APPLICATIONS

This application claims priority from U.S. Provisional Application No. 62/888,029, filed on Aug. 16, 2019. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for an enhanced beam adjustment procedure for a beam-based operation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein.

SUMMARY

Figure 1:
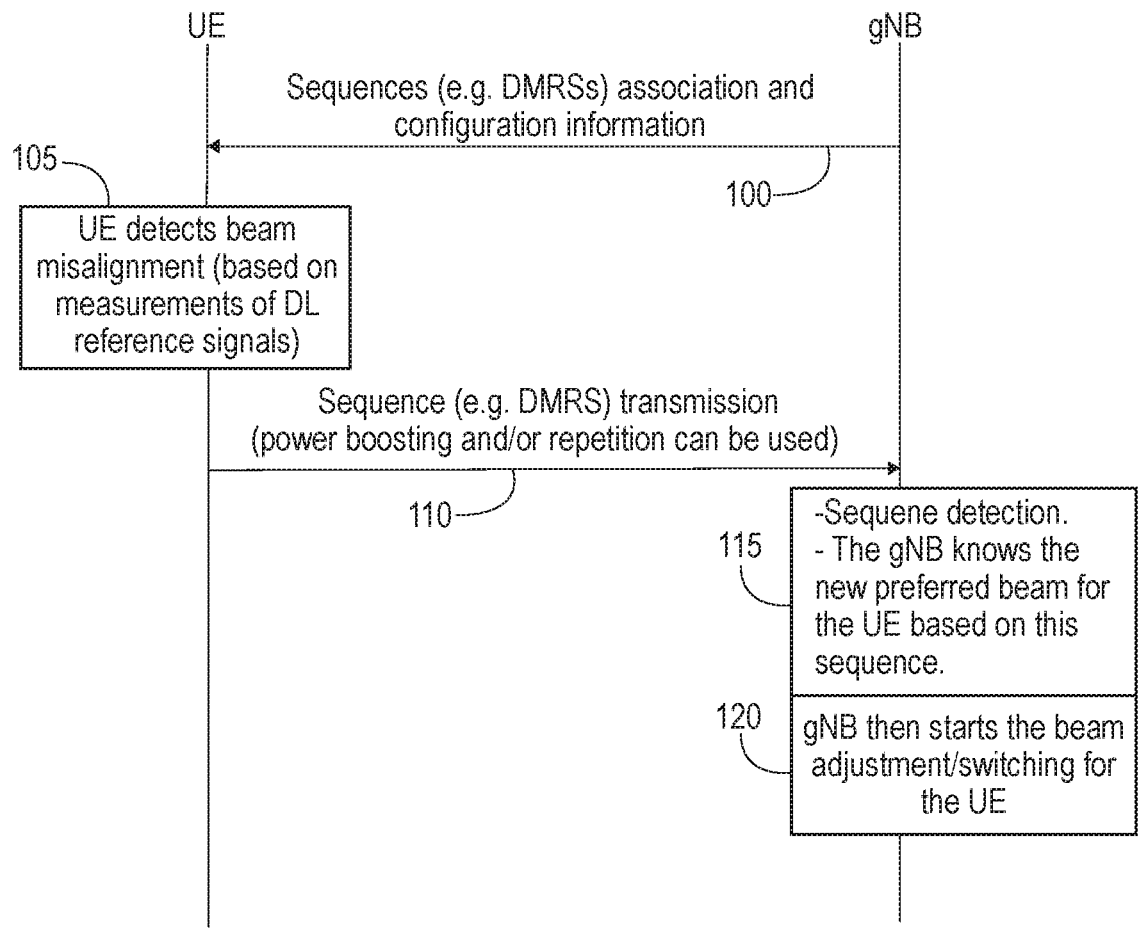
FIG. 1 illustrates a beam-adjustment procedure using beam-misalignment indication, according to an example embodiment.

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide an apparatus that comprises at least one memory comprising computer program code; at least one processor; wherein the at least one memory and the computer program code are configured, with the at least one processor, to cause the apparatus at least to receive, from a network node, association and configuration information for a plurality of sequences, where each sequence is associated to at least one network node beam or beam-pair link; perform beam measurements of beams from the network node to obtain beam measurement information; detect beam misalignment of the beam based on the beam measurement information; transmit a sequence among the plurality of sequences to the network node to inform the network node of the beam misalignment and an indication of a new preferred beam or beam-pair link; and trigger the network node to begin a beam adjustment procedure and a monitoring procedure for a configured-grant configuration.

In a further aspect thereof the exemplary embodiments of this invention provide an apparatus that comprises at least one memory comprising computer program code; at least one processor; wherein the at least one memory and the computer program code are configured, with the at least one processor, to cause the apparatus at least to configure a user equipment with association and configuration information for a plurality of sequences, wherein each sequence is associated to at least one network-node beam or beam-pair link; receive a sequence from the user equipment that comprises an indication of beam misalignment and a new preferred beam of the user equipment; and initiate a beam adjustment procedure and a monitoring procedure for a configured-grant configuration.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for an enhanced beam adjustment procedure for a beam-based operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

The current architecture in LTE networks is fully distributed in the radio and fully centralized in the core network. The low latency applications and services in 5G require to bring the content close to the radio which leads to local breakout and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, healthcare applications).

Grant-free (GF), also known as configured grant (CG) in NR, operation is an enabler that may be used to achieve the ultra-reliable and low-latency communication (URLLC) requirements in an uplink (UL) direction. For example, GF may allow for low UL transmission latencies, as it avoids the regular UL scheduling procedure of UE requesting and gNB granting transmission resources. To achieve sufficiently high reliability levels without penalizing the latency, NR CG transmission may support repetitions. For example, the UE may send multiple copies of the same packet without waiting for an acknowledgement of each replica. In addition, the time and frequency resources for URLLC UEs may be repeated based on certain predefined (higher layer configured) periodicity. To achieve very low latencies, a sufficiently short resource periodicity may need to be configured.

There are two types of configured grants in NR UL, Type 1 CG and Type 2 CG. When NR Type 1 CG is radio resource control (RRC) configured, or when Type 2 CG is RRC configured and activated, the UE may autonomously start the UL data transmission (TX) according to a configured periodicity and radio resources. For instance, Type 1 CG may only be based on RRC configuration without any L1 signaling (also released by RRC reconfiguration), and Type 2 CG may be based on both RRC configuration and L1 signaling for activation/release.

In certain instances, the UEs may be pre-allocated with resources and other necessary parameters before GF transmission. In addition, resource configuration and transmission parameters are either configured by RRC signaling only (for Type 1 CG), or split between RRC configuration and L1 signaling (for Type 2 CG). Among these parameters, UE-specific demodulation reference signal (DMRS) may be configured for each CG UL user. For example, the gNB may be able to properly identify the transmitting UE based on DMRS. Thus, CG UL transmissions may rely on a sufficiently robust DMRS detection and identification.

In $3^{rd}$ Generation Partnership Project (3GPP) Rel-16 NR, it has been agreed that a UE may be configured with multiple CG configurations. Using this feature allows for the ability to reduce latency and ensure reliability for a traffic with given requirements, and to support different (URLLC) traffic services with different requirements. An example of multiple configurations to reduce latency and ensure reliability may include having multiple resources where each is associated with a different starting position in time. The network may assign, for example, different DMRS-configurations or resource allocations per configuration, which would allow the ability to identify the configuration and avoid any ambiguity.

Additionally, NR may use a beam-based operation at high carrier frequencies to improve signal-to-noise-plus-interference ratio (SINR) and coverage. Further, beam management (BM) may establish and retain a suitable beam pair including, for example, a TX-side beam and a corresponding receiving (RX)-side beam that jointly provide good connectivity in both DL and UL. In some instances, a suitable TX/RX beam pair for the DL may also be a suitable beam pair for the UL and vice versa, which is known as beam correspondence. In this case, it may be enough to explicitly determine a suitable beam pair in just one of the transmission directions, and the same beam pair may then be used in the opposite communication direction.

A functionality of BM may include beam adjustment and tracking. In particular, this may include regularly re-evaluating the selection of the TX-side and the RX-side beam directions due to movements and rotations of the UE or movements of other objects in the environment that may block/unblock different beam pairs. For instance, if DL/UL beam correspondence may be assumed, explicit beam adjustment may only have to be carried out in one direction (e.g., in the DL direction), making it possible to assume that the adjusted DL beam-pair also applies to the UL direction.

In 3GPP Rel-15 NR specifications, the support for beam-related reporting and measurement configurations based on DL reference signals is described. The report content may include N-strongest L1-reference signal received powers (RSRPs) and the corresponding synchronization signal block (SSB) indices or CSI-RS indices. For L1-RSRP reporting for beam management, the UE may be configured with CSI-RS resources, SS/physical broadcast channel (PBCH) block resources, or both CSI-RS and SS/PBCH block resources. Further, the reporting configuration for BM may be part of the CSI reporting configuration. That is, the UE may be configured with physical uplink control channel (PUCCH) resources.

In case of analog beamforming at the gNB restricted to only one beam direction at a time (e.g., single-panel), UEs in different UL RX beams may be served in different transmission time intervals (TTIs) including, for example different mini-slots via beam sweeping (or switching). On the other hand, with multi-panels/subpanels or multiple serving gNBs, it may be possible to have some simultaneous UL RX beams in different beam direction at the same time.

For a URLLC UL CG UE operating with beam-based operation, and more generally for any URLLC UE, BM procedures (e.g., beam adjustment) may need to be robust and fast enough so that the latency and reliability are not impacted for that UE. Further, using the classic BM procedures previously described, a URLLC UE may need to be configured with frequent-enough PUCCH resources for beam-related measurement reporting. This may be needed to guarantee a fast beam adjustment and tracking, and the network may need to be able to monitor for beam-related reporting on those resources. In addition, the BM-related CSI reporting on these PUCCHs may need to be sufficiently reliable.

When operating with a beam-based operation, robust BM procedures may need to be ensured in order to establish and retain a good beam pair link. This is important for UEs with URLLC traffic, where the BM procedure should be reliable and fast enough so that the URLLC requirements are guaranteed.

To meet stringent latency and reliability requirements in UL for a URLLC UE operating with beam-based operation, one item that may need to be accounted for is that the network and the UE may need to be configured in such a way that allows a fast and reliable beam adjustment and tracking procedure. However, using classic BM procedures may require configuring the UE with frequent PUCCH resources, and the network should be able to monitor all of these resources (i.e., the corresponding beam should be allocated at the gNB for the resources). In addition, the beam-related reporting on those PUCCHs should be sufficiently reliable. This then may result in increasing the overhead due to configuring the UE with many PUCCH resources and thus the system needs to avoid scheduling other transmissions on those resources. This may also result in increasing the burden since the network needs to monitor all of the resources, which adds limitations on the beam sweeping operation. In addition, with the current procedures, the beam-adjustment operation may not be sufficiently robust/reliable, which may affect the reliability (and thus latency) performance. This may especially be the case when the UE has a URLLC traffic with stringent latency and reliability requirements. Thus, according to certain example embodiments, it may be possible to provide and enable a fast, reliable, and resource-efficient (i.e., low-overhead) beam adjustment/tracking procedure including, for example, for URLLC UEs operating with a CG UL operation.

Certain example embodiments may provide a beam adjustment procedure using a beam-misalignment indication. In one example embodiment, the UE may be configured with a new beam-misalignment indication, which may include the configuration of multiple sequences (such as DMRS) where each sequence may be used to indicate a different (TX/RX) beam of the gNB. For instance, in one embodiment, the association of the DMRS to a beam may be performed through an association of DMRS to a specific SSB. In another example embodiment, the association of the DMRS to a beam may be done through an association of the DMRS to a specific DL reference signal (such as CSI-RS). According to a further example embodiment, the association of the DMRS to a beam may be done through an association of the DMRS to a specific transmission configuration information (TCI) state.

In an example embodiment, the UE may perform beam measurements, and the beam measurements may, for example, be based on SSB and/or DL reference signals. According to an example embodiment, the beam measurement may include the legacy measurements of the Rel-15 beam management procedure including, for example, synchronization signal based reference signal received power (SS-RSRP), synchronization signal reference signal received quality (SS-RSRQ), SS-SINR, CSI-RSRP, CSI-RSRQ, and CSI-SINR. Alternatively, the legacy measurements may include some other measurement quantity derived from the received reference signals including SSB, for example.

In an example embodiment, after detecting beam misalignment (e.g., based on measurement on SSB and/or DL reference signals), the UE may send the specific/preconfigured sequence, such as DMRS, to inform the gNB that there is misalignment, and to indicate the new preferred beam or, more generally, the new preferred beam-pair link According to an example embodiment, the beam misalignment may be detected by the UE based on the relative measurement results of the different beams described above. Furthermore, the beam misalignment may trigger a sequence transmission that may be based on thresholds of the relative measurements. This may include, for example, the sequence associated with the new beam, which may be transmitted if the measurement quantity of the beam needs to be at least [X] times higher/lower or [Z] dB larger/smaller compared to the current serving beam. According to certain example embodiments, [X] and [Z] represent parameters that may be used by the UE to decide if there is beam misalignment based on the measurements of the reference signals. In addition, the relative threshold of [X] or [Z] of the beam misalignment definition may be defined in the specification or higher layer configured (as part of the beam misalignment configuration of the UE when configured with the new beam-misalignment indication as described above).

According to an example embodiment, the specific sequence (e.g., DMRS) transmission may be performed on a TX beam (and thus at a time instant) that corresponds to the current (i.e., misaligned) gNB beam. This transmission may use a transmit beam (i.e., filter) that may be different from the transmit beam that is selected for data transmission. In addition, the transmit beam for the sequence transmission may correspond to a narrower or a wider TX beam.

In one example embodiment, the specific sequence transmission may be configured with larger transmit power and/or repetition in order to increase the detection reliability. For example, this may help compensate effective isotropical radiated power (EIRP) loss due to, for example, a wider beam used and uncertainty in beam alignment. In another example embodiment, the sequence (e.g., DMRS) transmission may also accompany an UL channel transmission such as physical uplink shared channel (PUSCH) or PUCCH. According to certain example embodiments, the larger transmit power may be configured for a fallback DMRS transmission case, for example, to set the increase in transmit power (in dB) of the fallback DMRS transmission (and the potentially accompanying UL channel transmission) relative to, for example, the transmission power of a regular UL channel transmission such as PUSCH or PUCCH.

According to an example embodiment, the configuration of the sequences (e.g., DMRS) may be associated with an UL CG configuration, and the transmission of the specific sequence may utilize the CG configuration occasions including CG PUSCH, or without any UL-SCH data. In another example embodiment, after the gNB receives the beam-misalignment indication, the gNB may begin the beam adjustment/switching operation for the UE. For instance, in one embodiment, the gNB may immediately adjust/switch to the new preferred beam as indicated by the UE to serve this UE. In another example embodiment, the gNB may transmit a signal/message (e.g., medium access control (MAC) control element (CE)) to the UE to indicate that the gNB will start to use the new preferred beam.

Certain example embodiments may provide a beam-adjustment solution for a CG operation. For example, in one embodiment, the UE may be configured with one or more DMRSs associated with at least one active CG configuration (in addition to the regular DMRS associated with the CG PUSCH). The one or more DMRSs and the regular DMRS for the CG PUSCH may be associated with the same or different time-frequency resource configuration. In one example embodiment, the one or more DMRSs may be configured as "fallback" DMRSs that the UE may use to inform the network when detecting beam misalignment, serving as the beam-misalignment indication as previously described. Further, each of the fallback DMRSs may be used to indicate for example, one beam of the gNB. In addition, the association embodiments of the beam misalignment indication may also apply in this case. According to an example embodiment, the UE may be configured with one or more DMRSs associated with other non-active CG configurations, which may be used once the CG configuration becomes active.

In an example embodiment, after detecting beam misalignment (e.g., using measurements on SSB and/or DL reference signals), the UE may provide the gNB with misalignment information by sending the corresponding fallback DMRS. By detecting the fallback DMRS transmitted by the UE, the gNB may become aware of the UE's new preferred beam and of the beam alignment conditions at the UE. According to a further example embodiment, the beam adjustment with respect to CG operation may include one or more alternatives.

According to one example embodiment, the UE may be configured with multiple CG configurations, where each CG configuration is associated with a specific RX beam of the gNB. However, in some embodiments, only some of these configurations may be active at a time. Further, the active configurations may be determined either implicitly at the UE or explicitly based on gNB signaling.

In one example embodiment, according to a first option, at any time instance, the configuration(s) associated with the beam being used by the gNB for the UE may be considered active, and all the other configurations are inactive. This may be used, for example, for Type 1 CG in NR. In an example embodiment, the indication of the new preferred beam by the UE may automatically trigger the change of the applicable active CG configuration(s) without any needed beam adjustment/switching triggering by the gNB. In another example embodiment, in case of beam adjustment, the UE may switch to the CG configuration(s) corresponding to the new gNB beam after the UE received an indication from the gNB that it switches the beam for the UE as described herein.

According to a further example embodiment, explicit activation downlink control information (DCI) may be transmitted to the UE to activate one or more CG configurations associated with the new preferred gNB beam. The release of CG configurations may be done either implicitly based on activation DCI of other CG configuration(s) of the current beam, or explicitly using release DCI. This may be used, for example, for Type 1 CG in NR. Further, the activation/release DCI may include the index(es) of the Type 1 CG configuration(s) for activation/release, or a bitmap that indicates which of the Type 1 CG configuration(s) to activate/release.

In another example embodiment, which may be applicable to Type 2 CG, the UE may be configured with one or multiple CG configurations without any type of specific gNB RX beam association. For example, explicit activation DCI(s) may be transmitted to (re-)activate one or more CG configurations for transmission occasions fitting to the timing of the new preferred gNB beam. In addition, explicit release DCI(s) may need to be transmitted to release currently active CG configurations not fitting the new preferred gNB RX beam. Furthermore, there may be multiple active CG configurations at a time.

In an example embodiment, the gNB may start monitoring for CG transmissions from the UE on the new preferred RX beam based on the new active CG configuration associated with the new preferred RX beam, including the fallback DMRSs associated with the new active CG configuration. Further, the gNB may stop monitoring for CG transmission, including CG PUSCH (and regular DMRS) or fallback DMRS-only, on the other (outdated) RX beam, and the outdated CG configuration associated with the outdated beam.

FIG. 1 illustrates a beam-adjustment procedure using beam-misalignment indication, according to an example embodiment. As previously noted, the association may be between the sequences and (TX/RX) beams of the gNB. As illustrated in FIG. 1, at 100, the gNB may transmit sequences (e.g., DMRSs) association and configuration information to the UE. Further, the UE may, at 105, detect a beam misalignment based on measurements of DL reference signals. After detecting the beam misalignment, the UE may, at 110, transmit a sequence (e.g., DMRS) to the gNB to inform the gNB that there is beam misalignment, and to indicate the new preferred beam. As illustrated in FIG. 1, this specific sequence transmission may be configured to have larger transmit power and/or repetition in order to further increase the detection reliability. By detecting the specific sequence, at 115, the gNB may become aware of the misalignment situation at the UE. The gNB may then, at 120, start the beam adjustment/switching for the UE. In an example embodiment, the gNB may immediately adjust/switch to the new preferred beam as indicated by the UE to serve this UE. In another example embodiment, the gNB may transmit a signal/message to the UE to indicate that the gNB will start to use the new preferred beam.

According to an example embodiment, for a URLLC CG UE, and more generally for any URLLC UE, the beam adjustment and tracking procedure may need to be sufficiently fast and reliable in order to guarantee the stringent URLLC requirements. However, as previously discussed, using classic BM procedures may result in severely increasing the overhead and the burden in the system. To address this issue, certain example embodiments provide a reliable and low-overhead beam adjustment mechanism, which may rely on the beam-adjustment procedure illustrated in FIG. 1. Furthermore, in certain example embodiments, when the UE detects a beam misalignment, the UE may send a specific/preconfigured (i.e., fallback) DMRS to inform the gNB about the misalignment situation and about the new preferred beam. In addition, the fallback DMRS transmission may be configured to have power boosting and/or repetition. In an example embodiment, the repetition may be provided by configuring multiple DMRS positions within a slot. For example, the UE may also transmit PUSCH with multiple DMRS positions in the fallback case.

In the beam-alignment procedure of one example embodiment, the network may first configure the UE with the DMRSs association/mapping. This may include, for example, the "fallback" DMRSs and the "regular" DMRSs, where the fallback DMRSs may be used for DMRS transmissions for beam-misalignment indication, and the regular DMRSs may be used for the classic, regular PUSCH CG transmission (without the intention to indicate a beam change). In addition, the network may configure the larger transmit power and/or the number of repetitions for the fallback DMRS transmissions. In a further example embodiment, the UE may use different transmit beams (e.g., wider beam) for the fallback and regular DMRS transmission.

According to an example embodiment, the configuration and association information for the DMRSs may be, for example, included as a new part of the CG configuration. In this case, when the network configures the UE with CG, whether it is Type 1 CG or Type 2 CG, it may include for each CG resource configuration, new fields that provide the UE with the configuration and association information for the fallback DMRS(s). In an example embodiment, this association may be such that each fallback DMRS (of a CG configuration) is associated with a different RX beam of the gNB.

Figure 2:
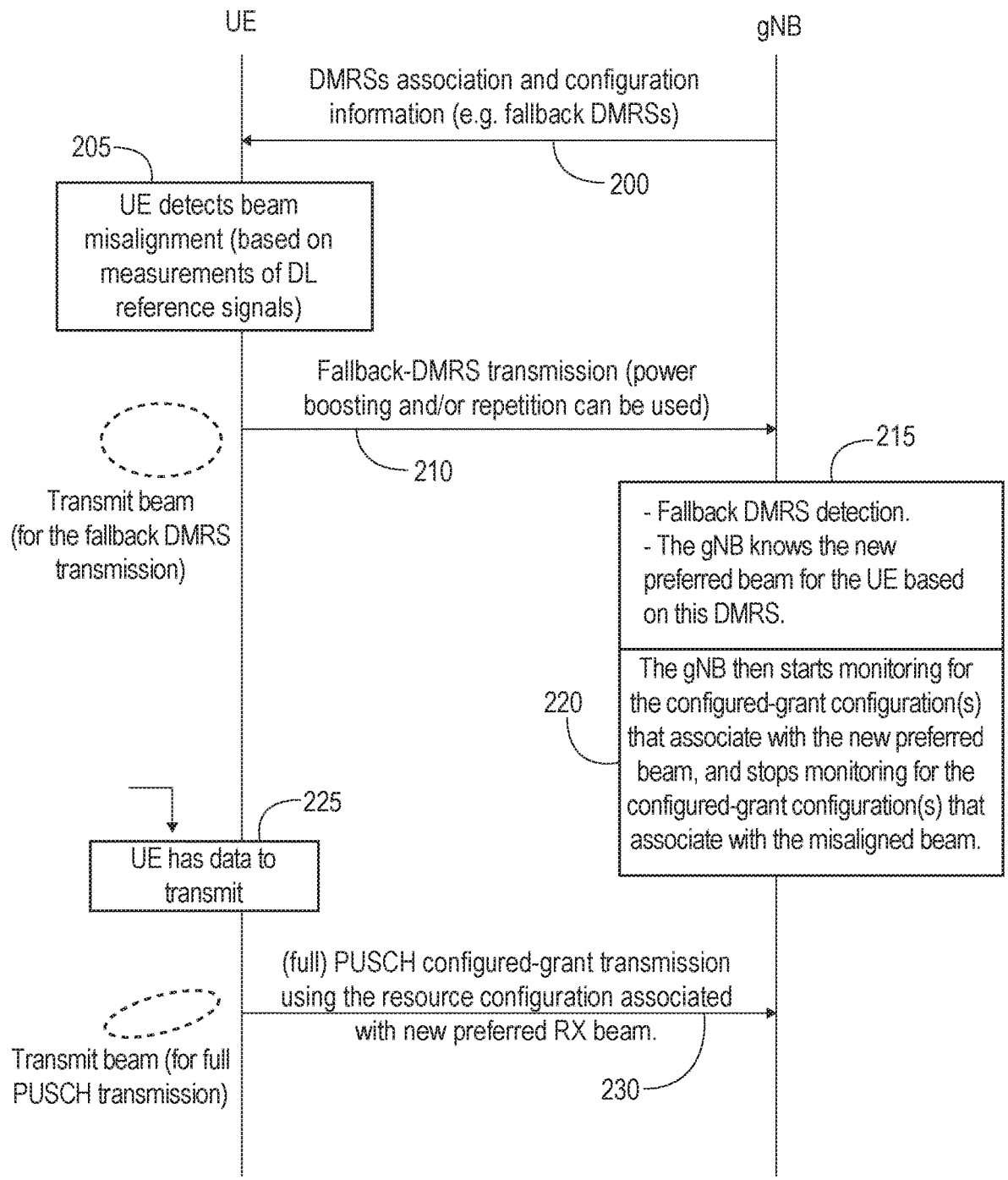
FIG. 2 illustrates a beam adjustment procedure for a configured-grant operation, according to an example embodiment.

FIG. 2 illustrates a beam adjustment procedure for a CG operation, according to an example embodiment. In particular, FIG. 2 illustrates an indication of a new preferred beam by the UE, which may automatically trigger the change of the applicable active CG configuration(s) without any needed beam adjustment/switching triggering by the gNB. Further, FIG. 2 illustrates, at 200, the gNB transmitting DMRSs association and configuration information to the UE. In an example embodiment, the DMRSs association and configuration information may include fallback DMRSs. Once received, the UE may, at 205, detect beam misalignment based on measurements on SSB and/or DL reference signals. At 210, the UE may transmit the fallback DMRS to the gNB. In an example embodiment, the transmission may be configured with larger transmit power and/or repetition.

As further illustrated in FIG. 2, at 215, the gNB may detect the fallback DMRS, and by detecting the fallback DMRS transmitted by the UE, the gNB may know the new preferred beam for the UE and of the beam alignment conditions at the UE. At 220, the gNB may start monitoring for the CG configuration(s) that is associated with the new preferred beam. The gNB may also stop monitoring for the CG configuration(s) that associate with the misaligned beam. Further, at 225, the UE may obtain data to transmit to the gNB, and at 230, the UE may transmit PUSCH CG using the resource configuration associated with the new preferred RX beam.

Figure 3A:
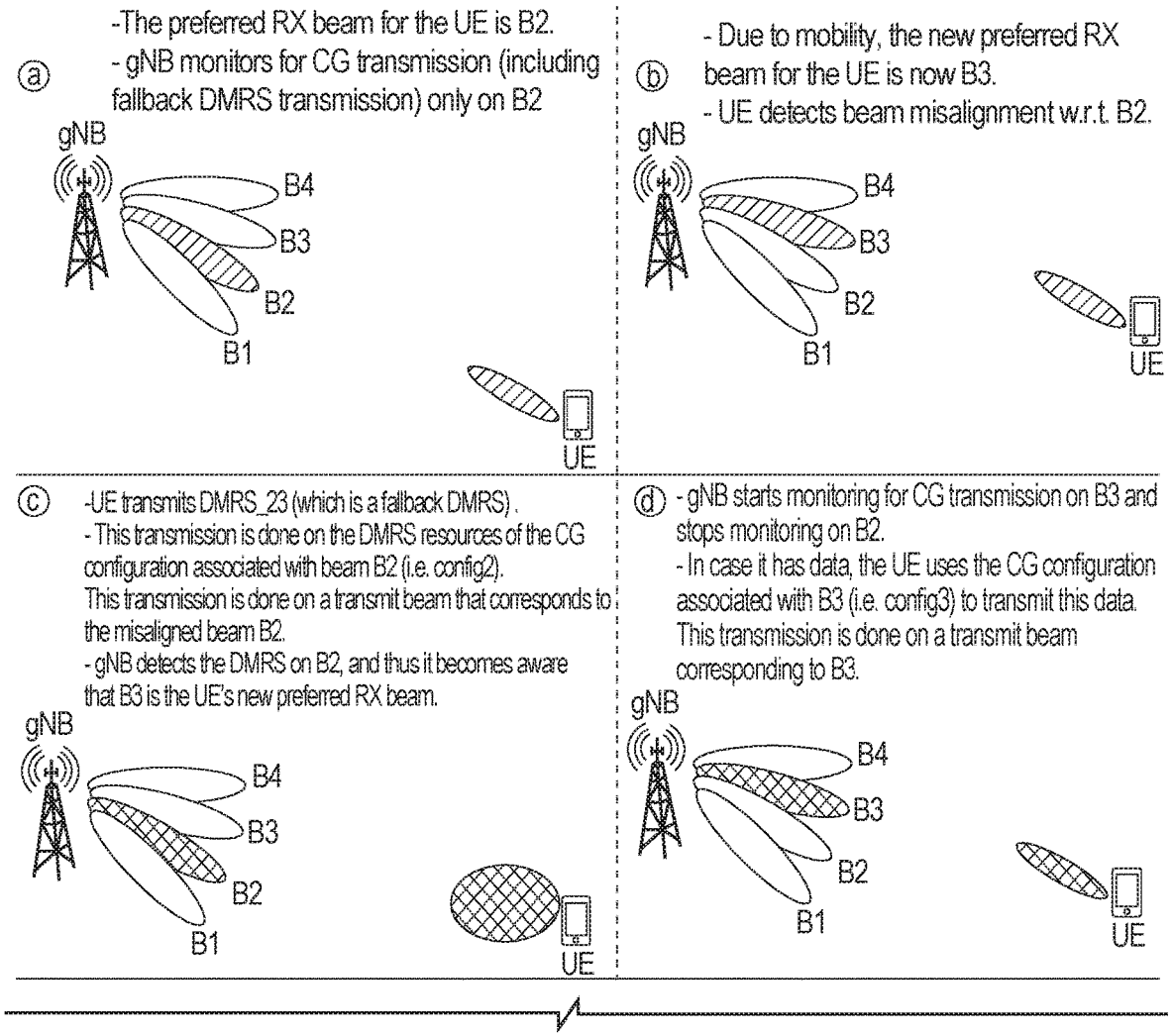
FIG. 3A and FIG. 3B illustrate another beam adjustment procedure for a configured-grant operation, according to an example embodiment.
Figure 3B:
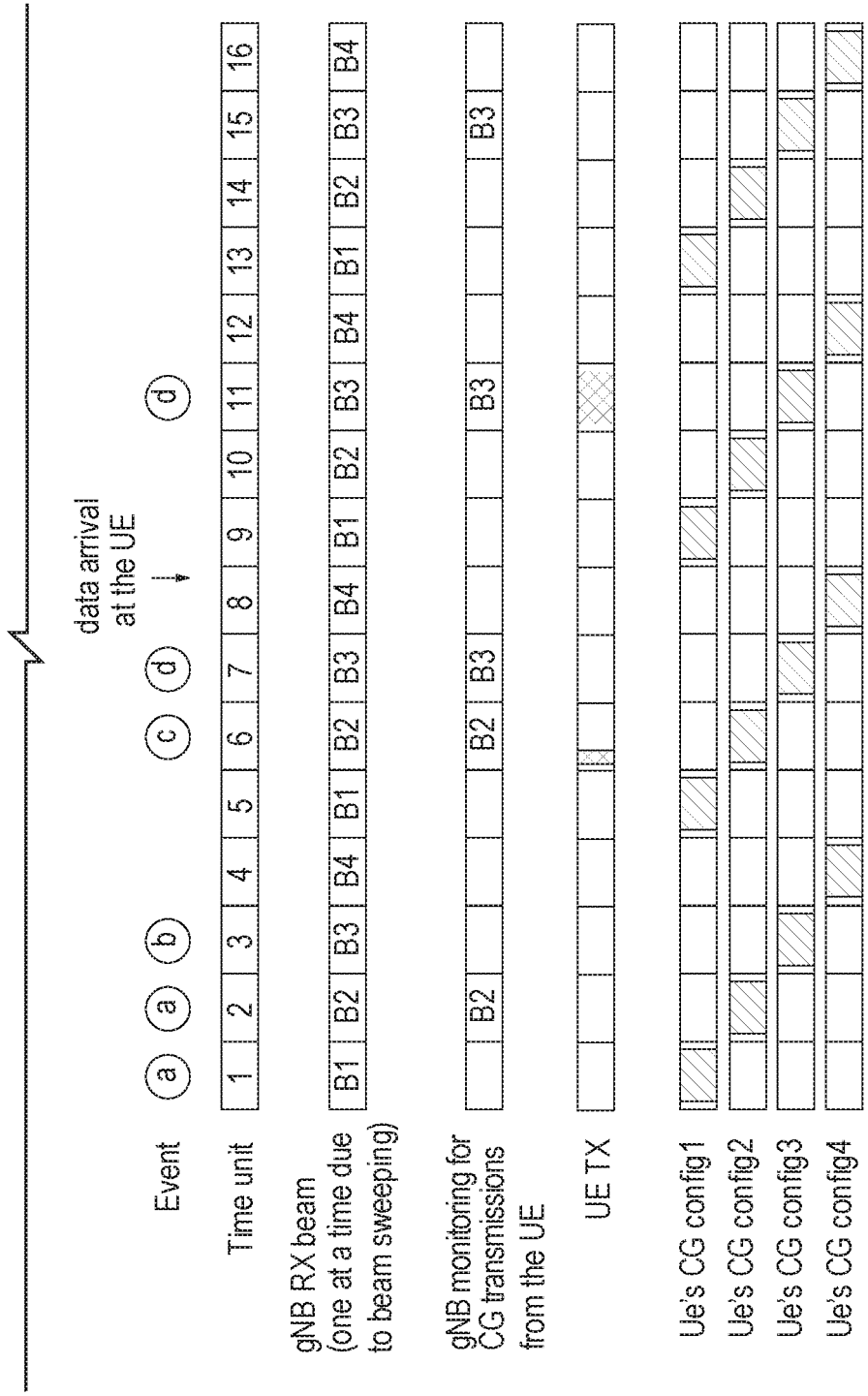

FIG. 3A and FIG. 3B illustrate a beam adjustment procedure for a configured-grant operation, according to an example embodiment. With the embodiment of FIG. 3A, the gNB may have four RX beams, where only one may be active at a time. In other example embodiments, the gNB may have more or less than four RX beams. In an example embodiment, the gNB may perform beam sweeping over the (four) RX beams. In addition, the UE may be configured with four CG resource configurations including, for example, config1, config2, config3, and config4 where each may be associated with an RX beam of the gNB at the corresponding time unit. According to an example embodiment, for each configuration, the resources may repeat in time according to a predefined periodicity. As previously noted, the resource allocation (including the time periodicity) and other parameters may be signaled to the UE as part of the CG configuration. In the example illustrated in FIG. 3B, the resource periodicity for each configuration may be equal to four time units, where a time unit may be, for example, a slot or sub-slot.

In an example embodiment, some of the above-described configurations may be seen as "conditional" configurations. For example, even though the UE may be configured with multiple configurations, the UE may start operating with, for example, only a certain CG configuration in the beginning, such as the one CG configuration that is associated with the best beam. To change to another configuration (among the remaining configurations) that is associated with a new preferred RX beam, the UE may first transmit the corresponding fallback DMRS. The DMRS transmission may serve as an "activation" of the corresponding CG configuration.

According to an example embodiment, for each of the CG configurations (config1, config2, config3, and config4), the UE may be configured with fallback and regular DMRSs. In one example embodiment, the regular DMRS may be used with the regular PUSCH transmission without the intent to indicate a new preferred gNB RX beam. As illustrated in FIG. 3B, CG config2 associated with gNB RX beam B2 may be configured with one regular DMRS, denoted as DMRS_2, and three fallback DMRSs, denoted as DMRS_21, DMRS_23, and DMRS_24. Here, DMRS_2$i$ may be used as an indication by the UE that "beam i" (i.e., Bi) is the new preferred beam.

In another example embodiment, config2 may be configured with one regular DMRS, denoted as DMRS_2, and two fallback DMRSs, denoted as DMRS_21 and DMRS_23. According to an example embodiment, there may not be a need to configure DMRS_24 because the UE may not switch from B2 to B4 directly. However, in certain example embodiments, for a CG configuration, the regular DMRSs of other configurations may also be used/configured as fallback DMRSs for that configuration.

According to an example embodiment, the gNB may monitor for CG transmissions of a specific UE on only one of the RX beams (i.e., the gNB may not expect any CG transmission from the UE on the other three beams) That is, the UE may only use one CG configuration at a time. This active CG configuration(s) may be associated with the RX beam that the gNB uses for the UE at the time.

In a further example embodiment, a CG transmission may either be a fallback DMRS transmission only, a CG PUSCH transmission including fallback DMRS (i.e. fallback DMRS and UL data) or a regular CG PUSCH transmission (i.e., regular DMRS and UL data). The fallback DMRS transmission may be used to inform the gNB about the beam misalignment situation and about the new preferred RX beam. In an example embodiment, this transmission may be performed on a transmit beam (i.e., filter) that corresponds to the misaligned RX beam of the gNB. Further, the UE transmit beam may be different from the transmit beam that corresponds to the new preferred RX beam. In addition, according to an example embodiment, the UE may be configured with larger transmit power and/or repetition for the fallback DMRS transmission.

According to certain example embodiments, the gNB may not need to monitor for CG transmissions on neighboring beams. For example, if B2 is the preferred RX beam for the UE, then the gNB may just monitor for transmissions (from this UE) on that beam and, thus, on the time units associated with that beam. That is, the gNB may not need to monitor for the UE on beams B1, B3, and B4 if the preferred beam for the UE is B2. This may be because in case of beam misalignment (e.g., at time unit 3), the UE may use a transmit beam that corresponds to the misaligned RX beam of the gNB to send the fallback DMRS. In addition, this transmit beam may correspond to a wider TX beam. In such a case, the UE may still transmit this DMRS at the next time-unit associated with beam B2. According to this procedure, it may be possible to increase the fallback DMRS detection reliability, especially that larger transmit power and/or repetition may be configured for the fallback DMRS transmission.

In an example embodiment, the beam adjustment may be triggered and completed in a short period of time, which may be of the order of the CG periodicity. For example, if the beam misalignment occurs at time-unit 3, then the UE may send the misalignment indication (i.e., the fallback DMRS) at time-unit 6 to inform the gNB that B3 is now its preferred RX beam instead of B2. Further, after detecting this indication, the gNB may start monitoring, for example, for data transmissions from the UE on beam B3 already at time-unit 7. Thus, if the UE has data to transmit, it may perform the PUSCH transmission at time-unit 7. Accordingly, it may require about four time-units from the time the misalignment was detected to the time the beam adjustment procedure was completed and the UE transmitting its data. Additionally, these results may be achieved from tying certain example embodiments to the CG configuration(s) for which the resources repeat in time according to a preconfigured periodicity that is set depending on the latency requirement of the UE.

According to an example embodiment, the UE may not need to be configured with additional time-frequency resources to indicate a change of the preferred beam. Further, the CG resource configurations may be needed for the data transmission, and multiple configurations may be needed so that at least the network does not have to reconfigure the UE each time there is beam adjustment; where for instance, each configuration may be associated with a different gNB RX beam.

Figure 4:
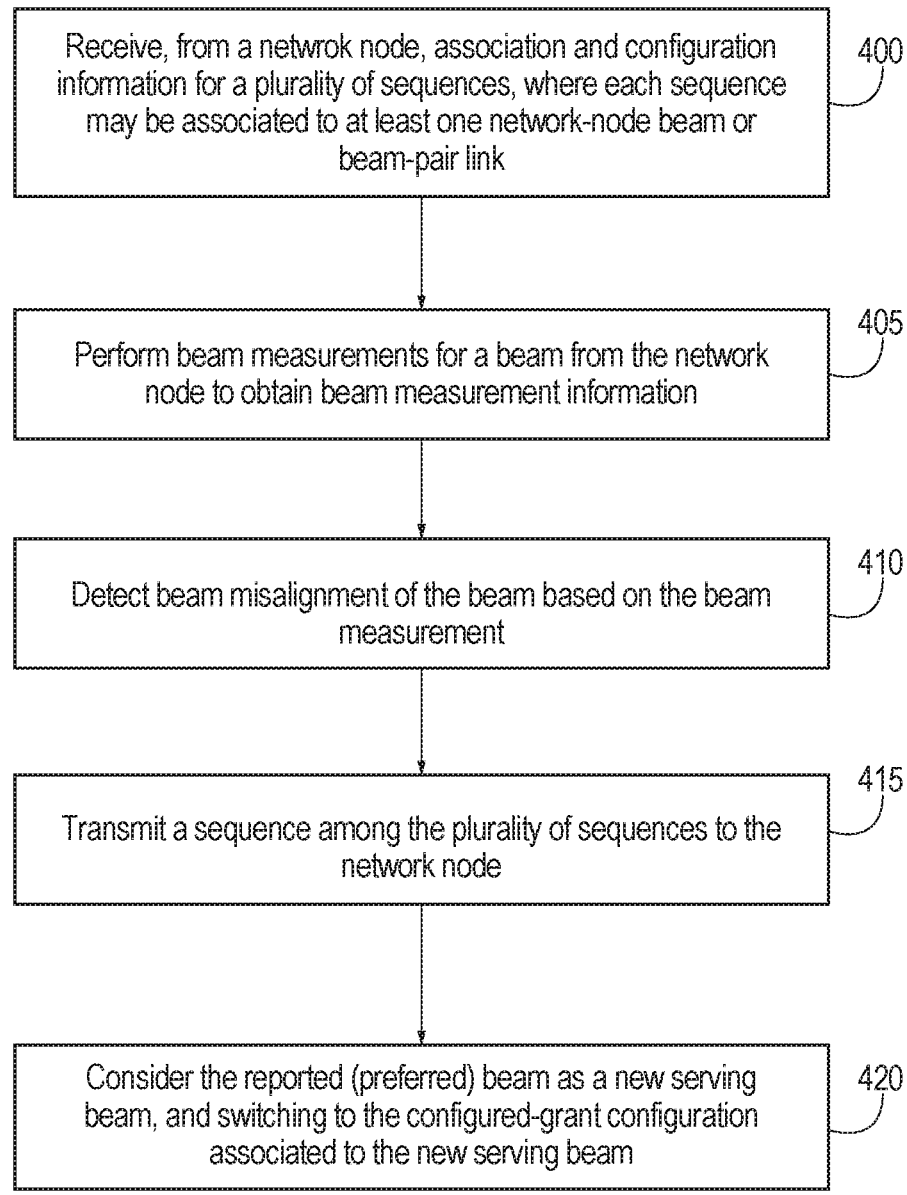
FIG. 4 illustrates a flow diagram of a method, according to an example embodiment.

FIG. 4 illustrates a flow diagram of a method, according to an example embodiment. In certain example embodiments, the flow diagram of FIG. 4 may be performed by a mobile station and/or UE, for instance similar to apparatus 10 illustrated in FIG. 6A. According to one example embodiment, the method of FIG. 4 may include initially, at 400, receiving, from a network node, association and configuration information for a plurality of sequences, where each sequence may be associated to at least one network-node beam or beam-pair link. The method may also include, at 405, performing beam measurements of beams from the network node to obtain beam measurement information. The method may further include, at 410, detecting beam misalignment of the beam based on the beam measurement information. In addition, the method may include, at 415, transmitting a sequence among the plurality of sequences to the network node to inform the network node of the beam misalignment, and to trigger the network node to start a beam adjustment procedure and a monitoring procedure for a configured-grant configuration. The method may further include, at 420, the UE to consider, after transmitting the sequence, the reported (preferred) beam as new serving beam, and to switch to the configured-grant configuration associated to the new serving beam.

In an example embodiment, the sequence may include an indication of a new preferred beam. In another example embodiment, the association and configuration information may include a configuration of the sequence that is associated with at least one active configured-grant configuration. In a further example embodiment, transmitting the sequence may utilize the configured-grant configuration that includes a configured-grant physical uplink shared channel or without any uplink shared channel. In another example embodiment, the association and configuration information may include associating a sequence with at least one network-node beam or beam-pair link According to an example embodiment, the sequence may include a demodulation reference signal, and the demodulation reference signal may indicate a different transmission/reception beam of the network node.

According to a further example embodiment, performing beam measurements may, for example, be based on SSB and/or DL reference signals. In an example embodiment, the sequence may be transmitted to the network node based on thresholds of the beam measurements. In another example embodiment, the sequence may be transmitted to the network node on a transmission beam that corresponds to the misaligned beam or a current serving beam. In a further example embodiment, the transmission of the sequence is configured with larger transmit power or repetition. In a further example embodiment, the transmission of the sequence may be accompanied by an uplink channel transmission. According to an example embodiment, the sequence may be associated with at least one non-active configured-grant configuration. In an example embodiment, the UE may receive a signal from the network node indicating that use of the new preferred beam will begin. In another example embodiment, the UE may, in response to receiving the signal from the network node, switch to the new serving beam and the associated configured-grant of the new serving beam.

According to an example embodiment, automatically switching from the misaligned beam to the new preferred beam may trigger the UE to automatically switch to a configured-grant configuration corresponding to the new preferred beam. In another example embodiment, the procedure for a configured-grant configuration may include receiving a configuration of a plurality of configured-grant configurations. In a further example embodiment, each configured-grant configuration of the plurality of configured grant configurations may be associated with a specific reception beam. According to an example embodiment, the UE may perform a configured-grant transmission on the new preferred beam based on the new active configured-grant configuration associated with the new preferred beam. According to a further example embodiment, the configured-grant configuration associated with the beam currently being used may be considered as active, and all other configured-grant configurations may be considered inactive.

Figure 5:
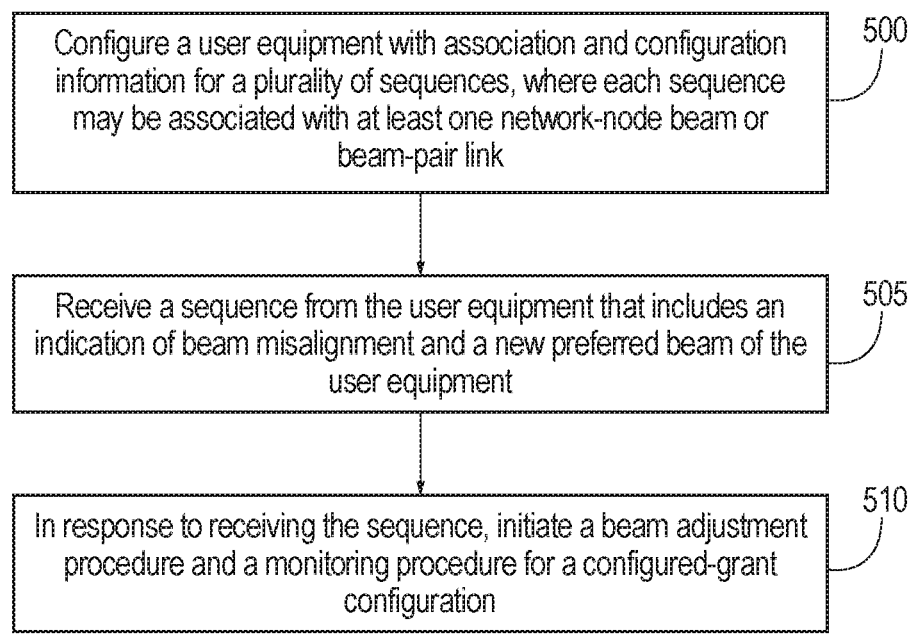
FIG. 5 illustrates a flow diagram of another method, according to an example embodiment.

FIG. 5 illustrates a flow diagram of another method, according to an example embodiment. In an example embodiment, the method of FIG. 5 may be performed by a telecommunications network, network entity or network node in a 3GPP system, such as LTE or 5G-NR. For instance, in an example embodiment, the method of FIG. 5 may be performed by a base station, eNB, or gNB, MCG, SCG, PCell, or PSCell for instance similar to apparatus 20 illustrated in FIG. 6B.

According to an example embodiment, the method of FIG. 5 may include initially, at 500, configuring a user equipment with association and configuration information for a plurality of sequences, where each sequence may be associated to at least one network-node beam or beam-pair link. The method may also include, at 505, receiving a sequence from the user equipment that may include an indication of beam misalignment and a new preferred beam of the user equipment. The method may further include, at 510, in response to receiving the sequence, initiating a beam adjustment procedure and a monitoring procedure for a configured-grant configuration.

According to an example embodiment, the beam adjustment procedure may include automatically switching from a misaligned beam to the new preferred beam to serve the user equipment in response to receiving the sequence, or transmitting, in response to receiving the sequence, a signal to the user equipment indicating that use of the new preferred beam will begin. According to another example embodiment, the association and configuration information may include a configuration of the sequence that is associated with at least one active configured-grant configuration, and the association and configuration information may include associating a sequence with at least one network-node beam or beam-pair link In an example embodiment, the procedure for a configured-grant configuration may include configuring the user equipment with a plurality of configured-grant configurations, and each configured-grant configuration of the plurality of configured-grant configurations may be associated with a specific reception beam.

In another example embodiment, the procedure for a configured-grant configuration may include monitoring for configured-grant transmission from the user equipment on the new preferred beam based on the new active configured-grant configuration associated with the new preferred beam. According to an example embodiment, the configured-grant configuration associated with a beam currently being used may be considered as active, and all other configured-grant configurations may be considered inactive. According to another example embodiment, automatically switching from the misaligned beam to the new preferred beam may trigger the network node to immediately start monitoring for the configured-grant configuration corresponding to the new preferred beam. According to a further example embodiment, transmitting a signal to the user equipment indicating that use of the new preferred beam will begin may trigger the user equipment to switch to a configured-grant configuration corresponding to the new preferred beam. In an example embodiment, the sequence for indicating the new preferred beam may include a demodulation reference signal, and the demodulation reference signal may indicate a different transmission/reception beam of the network node. In another example embodiment, the sequence may be configured with larger transmit power or repetition, and the sequence may be accompanied by an uplink channel transmission.

Figure 6A:
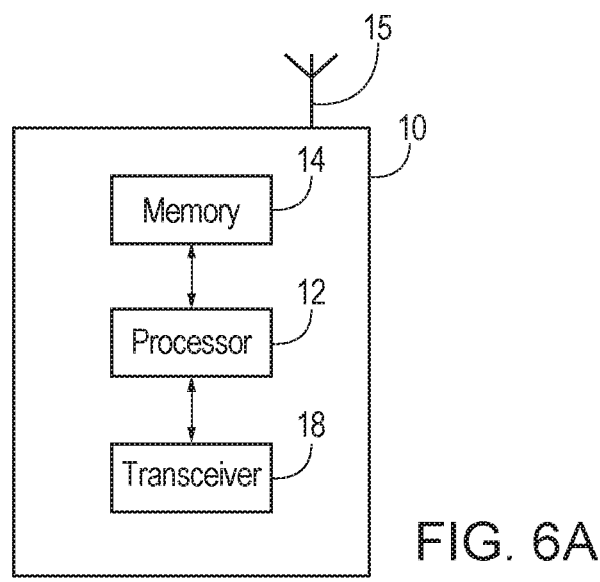
FIG. 6A illustrates an apparatus, according to an example embodiment.

FIG. 6A illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, a wireless actuator, a wireless control element or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 6A.

As illustrated in the example of FIG. 6A, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6A, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to receive, from a network node, association and configuration information for a plurality of sequences, where each sequence may be associated to at least one network-node beam or beam-pair link Apparatus 10 may also be controlled by memory 14 and processor 12 to perform beam measurements of beams from the network node to obtain beam measurement information. Apparatus 10 may further be controlled by memory 14 and processor 12 to detect beam misalignment of the beam based on the beam measurement information. In addition, apparatus 10 may be controlled by memory 14 and processor 12 to transmit a sequence among the plurality of sequences to the network node to inform the network node of the beam misalignment, and to trigger the network node to start a beam adjustment procedure and a monitoring procedure for a configured-grant configuration. Further, apparatus 10 may be controlled by memory 14 and processor 12 to consider the reported (preferred) beam as new serving beam, and to switch to the configured-grant configuration associated to that beam. Apparatus 10 may also be controlled by memory 14 and processor 12 to receive a signal to switch to the new serving beam and the associated configured-grant of the new serving beam.

Figure 6B:
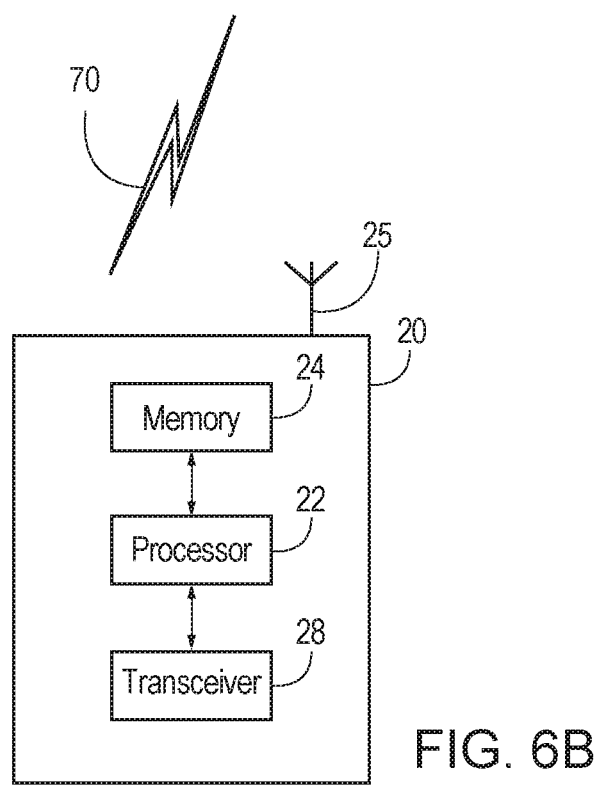
FIG. 6B illustrates another apparatus, according to an example embodiment.

FIG. 6B illustrates an apparatus 20 according to an example embodiment. In an example embodiment, the apparatus 20 may be a RAT, node, host, or server in a communication network or serving such a network. For example, apparatus 20 may be an MCG, SCG, PCell, PSCell, a satellite, base station, a Node B, an evolved Node B (eNB), 5G Node B (gNB) or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 6B.

As illustrated in the example of FIG. 6B, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-3 and 5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-3 and 5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to configure a user equipment with association and configuration information for a plurality of sequences, where each sequence may be associated to at least one network-node beam or beam-pair link. Apparatus 20 may also be controlled by memory 24 and processor 22 to receive a sequence from the user equipment that may include an indication of beam misalignment and a new preferred beam of the user equipment. Apparatus 20 may further be controlled by memory 24 and processor 22 to, in response to receiving the sequence, initiate a beam adjustment procedure and a monitoring procedure for a configured-grant configuration.

Certain example embodiments described herein provide several technical improvements, enhancements, and/or advantages. In some example embodiments, it may be possible to take advantage of CG resources to allow, in addition to data transmissions, maintaining a fast and reliable beam adjustment operation. It may also be possible to achieve a low-overhead beam adjustment mechanism that is particularly beneficial for URLLC grant free (i.e., configured-grant) UEs.

According to other example embodiments, it may be possible to decrease the overhead and the burden in the system. This may be due to the fact that there is no need to configure the UE with frequent PUCCH resources in order to maintain a fast beam adjustment operation; as would otherwise be needed with the classic BM procedures. Certain example embodiments may also increase the capacity of the system.

In other example embodiments, it may be possible to complete the beam adjustment operation in a very short period of time. As previously noted, this may be because certain embodiments are tied to the CG configuration(s) for which the resources may repeat in time according to a preconfigured periodicity that is set depending on the latency requirement. In other words, the beam adjustment may be achieved in a period of time that is as short as the CG periodicity, or at most of the same order of magnitude of this periodicity. Thus, it may be possible to obtain a fast beam adjustment mechanism, and guarantee the latency requirement (e.g., for the URLLC UE operating with beam-based operation).

According to other example embodiments, it may be possible to achieve a robust/reliable beam misalignment indication and, more generally, a beam adjustment operation. This may be due to reliance on a sequence such as DMRS to indicate the misalignment indication (including the information about the new preferred RX beam). In addition, this sequence transmission may be configured with power boosting and/or repetition in order to further increase the detection reliability.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

BM Beam Management
DMRS Demodulation Reference Signal
EIRP Effective Isotropical Radiated Power
eNB Enhanced Node B
gNB 5G or NR Base Station
LTE Long Term Evolution
NR New Radio
PUCCH Physical Uplink Control Channel
PUSCH Physical Uplink Shared Channel
RAN Radio Access Network
RS Reference Signal
RSRP Received Signal Received Power
RX Reception
SINR Signal-to-Noise-plus-Interference Ratio
SSB Synchronization Signal Block
TX Transmission
UE User Equipment A first embodiment is directed to a method that may include receiving, from a network node, association and configuration information for a plurality of sequences, where each sequence may be associated to at least one network-node beam or beam-pair link. The method may also include performing beam measurements of beams from the network node to obtain beam measurement information. The method may further include detecting beam misalignment of the beam based on the beam measurement information. In addition, the method may include transmitting a sequence among the plurality of sequences to the network node to inform the network node of the beam misalignment, and to trigger the network node to begin a beam adjustment procedure and a monitoring procedure for a configured-grant configuration.

In a variant, the sequence may include an indication of a new preferred beam, or more generally, beam-pair link In a variant, the method may also include, after transmitting the sequence, considering the preferred beam as a new serving beam and switching to the configured-grant configuration associated with the new serving beam.

In a variant, the association and configuration information may include a configuration of the sequence that is associated with at least one active configured-grant configuration, and transmitting the sequence may utilize the configured-grant configuration that includes a configured-grant physical uplink shared channel or without any uplink shared channel. In addition, the association and configuration information may include associating a sequence with at least one network-node beam or beam-pair link.

In a variant, the sequence may include a demodulation reference signal.

In a variant, the demodulation reference signal may indicate a different transmission/reception beam of the network node.

In a variant, performing beam measurements may include measuring the signal strength or quality of reference signals that may include a synchronization signal block.

In a variant, the sequence may be transmitted to the network node based on thresholds for the beam measurements.

In a variant, the sequence may be transmitted to the network node on a transmission beam that corresponds to the current serving beam.

In a variant, the transmission of the sequence may be configured with larger transmit power or repetition, and the transmission of the sequence may be accompanied by an uplink channel transmission.

In a variant, the sequence may be associated with at least one non-active configured-grant configuration.

In a variant, the UE may start to use the new preferred beam immediately after transmitting the sequence, or switch to the new beam after receiving a signal or message from the gNB that indicates a new beam. This may include for the UE to start using the CG configurations associated with the new serving beam.

In a variant, the procedure for a configured-grant configuration may include receiving a configuration of a plurality of configured-grant configurations.

In a variant, each configured-grant configuration of the plurality of configured grant configurations may be associated with a specific reception beam.

In a variant, the method may include performing a configured-grant transmission on the new preferred beam based on the new active configured-grant configuration associated with the new preferred beam.

In a variant, the configured-grant configuration associated with a beam currently being used may be considered as active, and all other configured-grant configurations may be considered inactive.

In a variant, automatically switching from the misaligned beam to the new preferred beam may trigger the user equipment to automatically switch to a configured-grant configuration corresponding to the new preferred beam.

A second embodiment may be directed to a method that may include configuring a user equipment with association and configuration information for a plurality of sequences, where each sequence may be associated to at least one network-node beam or beam-pair link. The method may also include receiving a sequence from the user equipment that comprises an indication of beam misalignment and a new preferred beam of the user equipment. The method may further include in response to receiving the sequence, initiating a beam adjustment procedure and a monitoring procedure for a configured-grant configuration.

In a variant, the beam adjustment procedure may include automatically switching from a misaligned beam to the new preferred beam to serve the user equipment in response to receiving the sequence, or transmitting, in response to receiving the sequence, a signal to the user equipment indicating that use of the new preferred beam will begin.

In a variant, the association and configuration information may include a configuration of the sequence that is associated with at least one active configured-grant configuration. In addition, the association and configuration information may include associating a sequence with at least one network-node beam or beam-pair link.

In a variant, the procedure for a configured-grant configuration may include configuring the user equipment with a plurality of configured-grant configurations, and each configured-grant configuration of the plurality of configured-grant configurations may be associated with a specific reception beam.

In a variant, the procedure for a configured-grant configuration may include monitoring for configured-grant transmission from the user equipment on the new preferred beam based on the new active configured-grant configuration associated with the new preferred beam.

In a variant, the configured-grant configuration associated with a beam currently being used may be considered as active, and all other configured-grant configurations may be considered inactive.

In a variant, automatically switching from the misaligned beam to the new preferred beam may trigger the network node to immediately start monitoring for the configured-grant configuration corresponding to the new preferred beam.

In a variant, transmitting a signal to the user equipment indicating that use of the new preferred beam will begin triggers the user equipment to switch to a configured-grant configuration corresponding to the new preferred beam and triggers the network node to start monitoring for the configured-grant configuration corresponding to the new preferred beam.

In a variant, the sequence may include a demodulation reference signal, and the demodulation reference signal may indicate a different transmission/reception beam of the network node.

In a variant, the sequence may be configured with larger transmit power or repetition, and the sequence may be accompanied by an uplink channel transmission.

Another embodiment is directed to an apparatus including at least one processor and at least one memory including computer program code. The at least one memory and the computer program code may be configured, with the at least one processor, to cause the apparatus at least to perform the method according to the first embodiment or the second embodiment or any of their variants discussed above.

Another embodiment is directed to an apparatus that may include circuitry configured to perform the method according to the first embodiment or the second embodiment or any of their variants.

Another embodiment is directed to an apparatus that may include means for performing the method according to the first embodiment or the second embodiment or any of their variants.

Another embodiment is directed to a computer readable medium including program instructions stored thereon for performing at least the method according to the first embodiment or the second embodiment or any of their variants.

What is claimed is:

1. An apparatus, comprising: at least one memory comprising computer program code; at least one processor; wherein the at least one memory and the computer program code are configured, with the at least one processor, to cause the apparatus at least to:
   receive, from a network node, association and configuration information for a plurality of sequences, where each sequence is associated to at least one network node beam or beam-pair link;
   perform beam measurements of beams from the network node to obtain beam measurement information;
   detect beam misalignment of the beam based on the beam measurement information;
   transmit a sequence among the plurality of sequences to the network node to inform the network node of the beam misalignment and an indication of a new preferred beam or beam-pair link;
   trigger the network node to begin a beam adjustment procedure and a monitoring procedure for a configured-grant configuration;
   consider the preferred beam as a new serving beam; and
   switch to the configured-grant configuration associated with the new serving beam.

2. The apparatus according to claim 1, wherein the association and configuration information comprises a configuration of the sequence that is associated with at least one active configured-grant configuration.

3. The apparatus according to claim 1, wherein the transmitting the sequence utilizes the configured-grant configuration that comprises a configured-grant physical uplink shared channel or without any uplink shared channel.

4. The apparatus according to claim 1, wherein the association and configuration information comprises associating a sequence with at least one network-node beam or beam-pair link.

5. The apparatus according to claim 1, wherein the sequence comprises a demodulation reference signal, and the demodulation reference signal indicates a different transmission/reception beam of the network node.

6. The apparatus according to claim 1, wherein performing beam measurements comprises measuring signal strength or quality of reference signals that comprises a synchronization signal block.

7. The apparatus according to claim 1, wherein the transmission of the sequence is at least one of configured with larger transmit power or repetition, accompanied by an uplink channel transmission, and based on thresholds for the beam measurements.

8. The apparatus according to claim 1, wherein the procedure for the configured-grant configuration comprises receiving a configuration of a plurality of configured-grant configurations and each configured-grant configuration of the plurality of configured grant configurations is associated with a specific reception beam.

9. The apparatus according to claim 1, wherein the at least one memory and the computer program code are configured, with the at least one processor, cause the apparatus at least to: perform a configured-grant transmission on the new preferred beam based on a new active configured-grant configuration associated with the new preferred beam.

10. The apparatus according to claim 1, wherein automatically switching from the misaligned beam to the new preferred beam triggers the apparatus to automatically switch to a configured-grant configuration corresponding to the new preferred beam.

11. An apparatus, comprising:
- at least one memory comprising computer program code;
- at least one processor; wherein the at least one memory and the computer program code are configured, with the at least one processor, to cause the apparatus at least to:
- configure a user equipment with association and configuration information for a plurality of sequences, wherein each sequence is associated to at least one network-node beam or beam-pair link;
- receive a sequence from the user equipment that comprises an indication of beam misalignment and a new preferred beam of the user equipment; and
- initiate a beam adjustment procedure and a monitoring procedure for a configured-grant configuration,
- wherein the beam adjustment procedure comprises automatically switching from a misaligned beam to the new preferred beam to serve the user equipment in response to receiving the sequence.

12. The apparatus according to claim 11, wherein the at least one memory and the computer program code are configured, with the at least one processor, cause the apparatus at least to: transmit, in response to receiving the sequence, a signal to the user equipment indicating that use of the new preferred beam will begin.

13. The apparatus according to claim 11, wherein the association and configuration information comprises a configuration of the sequence that is associated with at least one active configured-grant configuration.

14. The apparatus according to claim 11, wherein the procedure for the configured-grant configuration comprises configuring the user equipment with a plurality of configured-grant configurations, and each configured-grant configuration of the plurality of configured-grant configurations is associated with a specific reception beam.

15. The apparatus according to claim 11, wherein the procedure for the configured-grant configuration comprises monitoring for configured-grant transmission from the user equipment on the new preferred beam based on a new active configured-grant configuration associated with the new preferred beam.

16. The apparatus according to claim 11, wherein the configured-grant configuration associated with a beam currently being used is considered as active, and all other configured-grant configurations are considered inactive.

17. The apparatus according to claim 11, wherein transmitting a signal to the user equipment indicating that use of the new preferred beam triggers the user equipment to switch to a configured-grant configuration corresponding to the new preferred beam and triggers the apparatus to start monitoring for the configured-grant configuration corresponding to the new preferred beam.

18. The apparatus according to claim 11, wherein the sequence is configured with larger transmit power or repetition, and the sequence is accompanied by an uplink channel transmission.

* * * * *